United States Patent [19]

Harano

[11] Patent Number: 5,771,445
[45] Date of Patent: Jun. 23, 1998

[54] PORTABLE RADIO RECEIVER WITH BUILT-IN ANTENNA

[75] Inventor: Nobuya Harano, Tokyo, Japan

[73] Assignee: NEC Corporation, Tokyo, Japan

[21] Appl. No.: 551,125

[22] Filed: Oct. 31, 1995

[30] Foreign Application Priority Data

Oct. 31, 1994 [JP] Japan ................................. 6-290638

[51] Int. Cl.$^6$ .................................................. H04B 1/08
[52] U.S. Cl. ...................... 455/351; 455/269; 455/575; 455/90
[58] Field of Search .............................. 455/89, 90, 129, 455/280, 351, 347, 575, 349, 269; 361/814; 343/702

[56] References Cited

U.S. PATENT DOCUMENTS

| 4,935,745 | 6/1990 | Mori et al. ............................ 343/702 |
| 5,175,873 | 12/1992 | Goldenberg et al. .................. 455/89 |
| 5,258,892 | 11/1993 | Stanton et al. ......................... 361/814 |

FOREIGN PATENT DOCUMENTS 1 305726  12/1989  Japan .
3 289801  12/1991  Japan .

*Primary Examiner*—Andrew Faile
*Assistant Examiner*—Vincent F. Boccio
*Attorney, Agent, or Firm*—Scully, Scott, Murphy & Presser

[57] ABSTRACT

A portable radio receiver with a built-in antenna includes first and second housing sections made of a dielectric having a high dielectric constant, an antenna conductor disposed in an internal space between the two housing sections, and an apparatus board to be connected to the antenna conductor. The antenna conductor is formed as a loop antenna. A recessed portion is formed in the joint surface of the first housing section. A groove for accommodating the loop antenna is formed at a deep end in the inner wall of the recessed portion. A projecting portion to fit in the recessed portion is formed on the joint surface of the second housing section. When the recessed and projecting portions are fitted with each other, the two housing sections form one integral body, and the loop antenna is sandwiched between the recessed and projecting portions.

4 Claims, 4 Drawing Sheets

FEEDER POINT

FEEDER POINT

FEEDER POINT

FEEDER POINT

FEEDER POINT

PORTABLE RADIO RECEIVER WITH BUILT-IN ANTENNA

BACKGROUND OF THE INVENTION

1. Field of the Invention

The present invention relates to a portable radio receiver represented by a personal radio paging receiver and, more particularly, to a portable radio receiver whose antenna conductor is interposingly housed between two housing sections of the radio receiver.

2. Description of the Prior Art

In a portable radio receiver, conventionally, an antenna conductor is disposed in the housing of the radio receiver from the viewpoint of portability, operability, and the like.

When the antenna conductor is provided in the housing, since no projection exists on the surface of the housing of the radio receiver, the portability and operability of the radio receiver are increased, and an accident in which, e.g., the antenna pierces the user's body can be eliminated, thus contributing to the safety when carrying the radio receiver. Therefore, this arrangement is employed widely.

When the antenna conductor is disposed in the housing, however, the size of the antenna is limited by the size of the housing. More specifically, the antenna must be inevitably smaller than the size of the internal space of the housing.

In general, the gain of an antenna is determined by the size of the antenna. The smaller the antenna, the lower the gain of the antenna.

Accordingly, in a portable radio receiver, e.g., a pocket bell, which is constituted by a very small housing, the antenna disposed in the housing can only obtain a low gain.

Regarding an antenna of this type which is disposed in the housing, since the antenna conductor is present in the vicinity of the panel of the radio unit, the antenna can be easily influenced by the metal components and the like of the apparatus board, leading to a further decrease in gain.

Therefore, in order to solve these problems, Japanese Unexamined Patent Publication No. 1-305726 proposes a small-sized receiver in which a plastic housing is made of a ferrite, and an antenna conductor serving as a loop antenna is buried in the plastic housing.

According to this small-sized receiver, as the antenna is not disposed in the space in the housing but is directly buried in the wall portion of the housing, the antenna loop can be made larger than that of a conventional receiver, and the antenna loop can be separated from the apparatus board and the like, thereby improving the gain of the antenna.

Japanese Unexamined Patent Publication No. 3-289801 discloses an antenna apparatus for a portable radio receiver in which the radio unit is stored in a housing made of an insulator, and the belt- or wire-like antenna conductor is adhered on or buried in the outer surface of the housing of the radio receiver to form a loop, thereby maximizing the loop area of the antenna. Simultaneously, the radio unit and the antenna are separated from each other, thereby improving the gain of the antenna.

However, in the radio receivers described in these official gazettes, the antenna conductor is buried in the housing of the radio receiver. If this arrangement is to be put into practice, plastic molding must be performed after the antenna conductor is disposed in the center of the housing wall, leading to a considerable difficulty in the manufacture.

When the antenna is buried in the housing, although damage or the like to the surface portion of the housing can be eliminated if only the housing is replaced, the antenna must also be replaced, thus wasting the intact antenna. Moreover, every time the housing is replaced, matching between the antenna and the apparatus circuit must be set.

In a portable radio receiver, the housing can often be damaged due to its nature, and recently a portable radio receiver, is generally available for rent. Accordingly, it is estimated that the demand for replacing only the housing of the radio receiver will further increase. Thus, the conventional problems described above are more serious in this case.

SUMMARY OF THE INVENTION

The present invention has been proposed to solve the problems of the conventional technique, and has as its object to provide a portable radio receiver with a built-in antenna in which the antenna conductor can be interposingly housed between two housing sections of the radio receiver very easily and reliably and a high antenna gain can be obtained.

In order to achieve the above object, according to the first aspect of the present invention, there is provided a portable radio receiver with a built-in antenna, comprising a housing, an antenna conductor disposed in an internal space of the housing, and an apparatus board to be connected to the antenna conductor, wherein the housing is divided into at least two sections, and the divided housing sections form one integral housing upon being joined together, and the antenna conductor is interposingly housed between of the divided housing sections.

According to the second aspect of the present invention, there is provided a portable radio receiver with a built-in antenna of the first aspect, wherein the antenna conductor is a loop antenna, one divided housing section of the at least two divided housing sections has a joint surface formed with a recessed portion, the recessed portion is formed with a groove, at a deep end in an inner wall thereof, for accommodating the loop antenna, and the other divided housing section has a joint surface formed with a projecting portion to fit in the recessed portion, and when the recessed and projecting portions are fitted with each other, the two divided housing sections form one integral body, and the loop antenna is sandwiched between the recessed and projecting portions.

According to the third aspect of the present invention, there is provided a portable radio receiver with a built-in antenna of the first aspect, wherein the antenna conductor is a panel type antenna disposed on a plate-like member, one divided housing section of the at least two divided housing sections has a joint surface formed with a recessed portion so as to be able to accommodate at least the panel type antenna therein, and the other divided housing section has a joint surface formed with a projecting portion to fit in the recessed portion and to be abutted against a rear surface of the panel type antenna, and when the recessed and projecting portions are fitted with each other, the two divided housing sections form one integral body, and the panel type antenna is sandwiched between the recessed and projecting portions.

According to the fourth aspect of the present invention, the housing of any one of the first to third aspects is made of a dielectric having a high dielectric constant.

According to the portable radio receiver with a built-in antenna of the present invention having the above aspects, the antenna can be incorporated in the housing only by storing and sandwiching the antenna conductor between the recessed and projecting portions of the joint surfaces of the housing sections, and assembling the housing sections.

Thus, the manufacture of the radio receiver becomes very simple, and the antenna can be disposed very reliably and can be spaced apart from the apparatus board by a predetermined distance.

Even when damage or the like to the housing occurs, the housing can be replaced easily without replacing the antenna.

Furthermore, if the housing is made of a material having a high dielectric constant, the antenna gain can be further increased.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF PREFERRED EMBODIMENTS

Several preferred embodiments of a portable radio receiver with a built-in antenna according to the present invention will be described with reference to the accompanying drawings.

Figure 1:
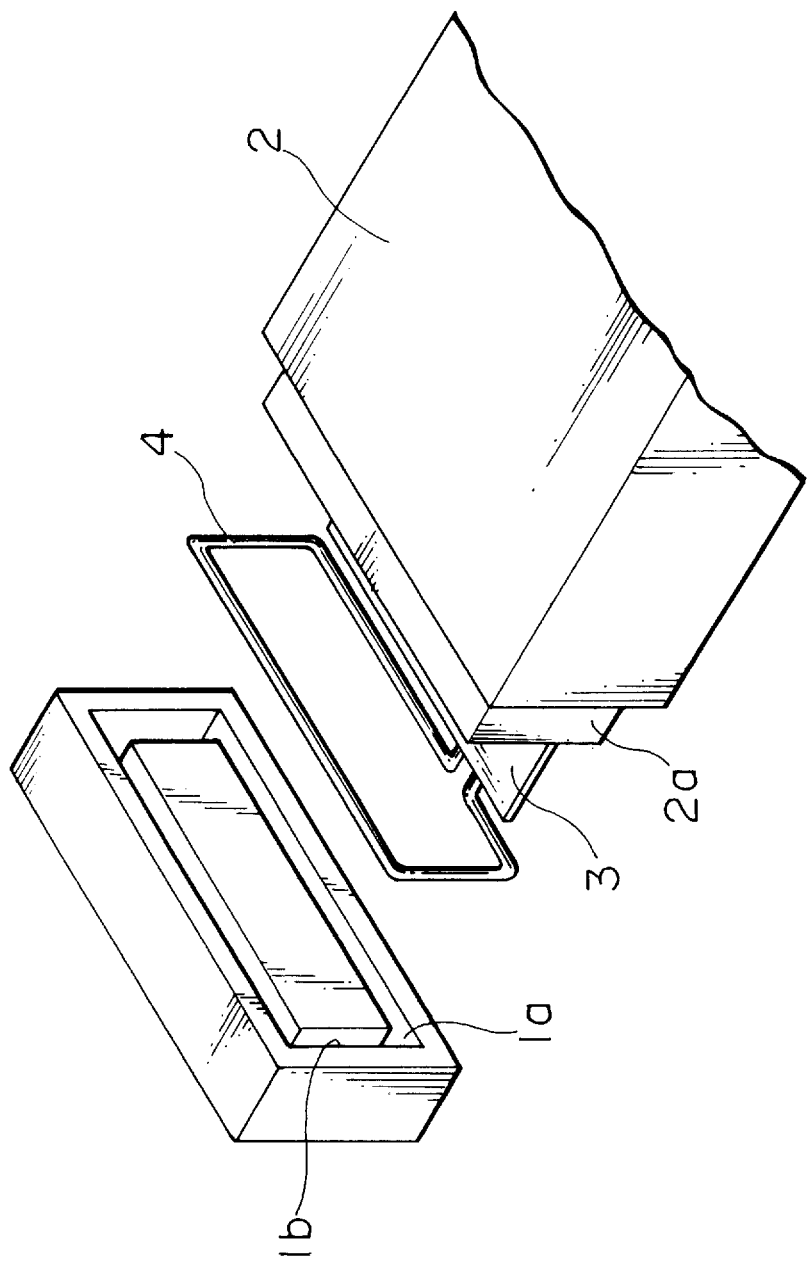
FIG. 1 is an exploded perspective view showing the first embodiment of the present invention.
Figure 2A:
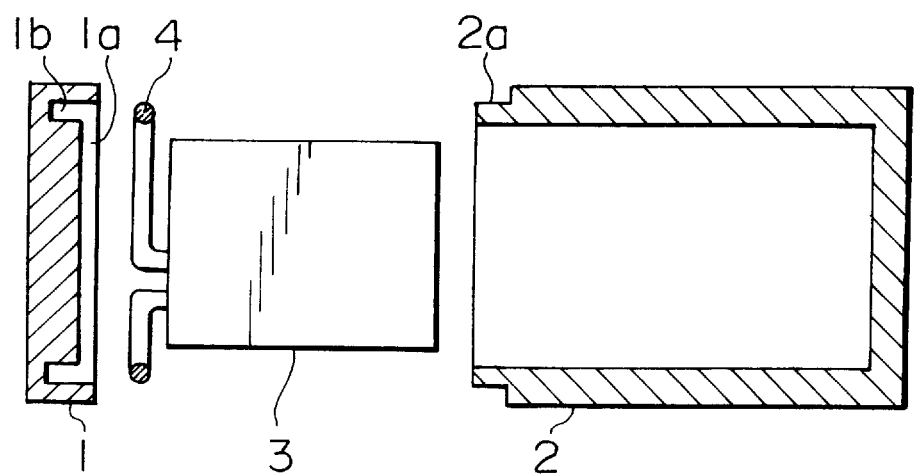
FIG. 2A is an exploded plan view, partially having a sectional portion, of the first embodiment shown in FIG. 1.
Figure 2B:
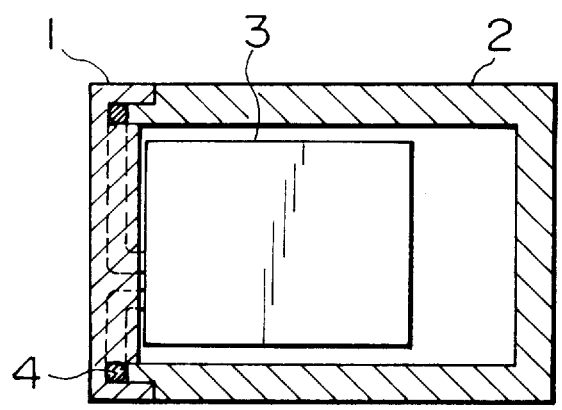
FIG. 2B is a sectional view showing the assembled state of the first embodiment.

FIG. 1 is an exploded perspective view of a portable radio receiver according to the first embodiment of the present invention. FIG. 2A is an exploded plan view, partially having a sectional portion, of the portable radio receiver shown in FIG. 1. FIG. 2B is a sectional view showing the assembled state of the portable radio receiver of the first embodiment.

As shown in FIGS. 1 to 2B, the portable radio receiver with a built-in antenna is constituted by a first housing section 1, a second housing section 2, an apparatus board 3, and an antenna conductor 4.

The first and second housing sections 1 and 2 can be divided from and fitted with each other, and form one integral body when joined together, thus constituting a hollow radio receiver housing.

Regarding the joint portions of the first and second housing sections 1 and 2, a recessed structure is formed in the joint surface of the first housing section 1, and a projecting structure is formed on the joint surface of the second housing section 2. When these recessed and projecting structures are fitted with each other, the two housing sections 1 and 2 become integral.

More specifically, a recessed portion 1a and a projecting portion 2a are formed around the edge portions of the joint surfaces of the first and second housing sections 1 and 2, respectively. The recessed and projecting portions 1a and 2a are fitted with each other, thereby joining the two housing sections together.

A groove 1b for accommodating the antenna conductor 4 is formed in the deep end of the inner wall of the recessed portion 1a.

As the material of the first and second housing sections 1 and 2, a material, e.g., a plastic, having a light weight and a high durability is usually employed. In this embodiment, a dielectric material, e.g., a polycarbonate resin, having a high dielectric constant is used to increase the antenna gain.

Generally, when an induced electromotive force E of a loop antenna is calculated in accordance with the Neumann rule, it will be expressed as:

$$E = -j\omega \sqrt{\epsilon\mu} \; AE_0 \sin\theta$$

where $E_0$ is the strength of the electric field at the receiving point, $\Theta$ is the angle defined by the propagating direction of the received radio wave and the direction of the normal to the loop surface, $\epsilon$ and $\mu$ are the dielectric constant and the magnetic permeability, respectively, of the space, and A is the area of the loop.

In this equation, when $\epsilon$ is increased, E is increased on the order of the square root of $\epsilon$.

More specifically, when the housing constituting the radio receiver is made of a dielectric having a high dielectric constant, the antenna gain can be increased.

The apparatus board 3 is disposed in the internal space of the second housing section 2, and has an antenna feeder portion on its first housing section 1 side, so that the antenna conductor 4 is connected to the apparatus board 3.

The antenna conductor 4 is made of a wire- or belt-like conductor having a circular or rectangular section, and forms a rectangular loop. The groove 1b formed in the recessed portion 1a of the first housing section 1 has a shape similar to that of the loop antenna, so that it can accommodate the antenna conductor 4. Therefore, when the antenna conductor 4 forming the loop antenna is disposed in the groove 1b (the state of FIG. 2A) and the projecting portion 2a of the second housing section 2 is fitted in the recessed portion 1a of the first housing section 1, the antenna conductor 4 is accommodated in and sandwiched between the housing sections 1 and 2 (the state of FIG. 2B).

According to the portable radio receiver with a built-in antenna of this embodiment having the above arrangement, since the antenna can be incorporated in the housing only by accommodating the antenna conductor 4 in the groove 1b and assembling the first and second housing sections 1 and 2 together, the manufacture of the radio receiver becomes very easy. Also, the antenna can be reliably disposed and can be spaced apart from the apparatus board by a predetermined distance.

Even if damage or the like to the housing occurs, the housing can be replaced without replacing the antenna.

When the housing is made of a material having a high dielectric constant, the antenna gain can be further increased.

A portable radio receiver with a built-in antenna according to the second embodiment of the present invention will be described with reference to FIGS. 3A and 3B.

Figure 3A:
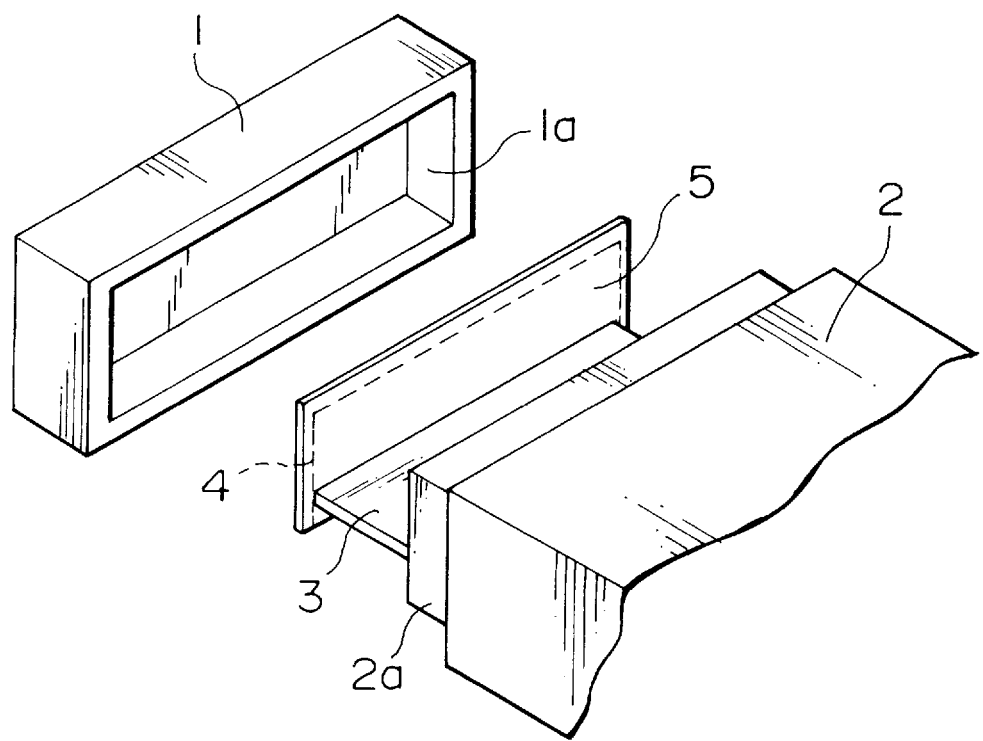
FIG. 3A is an exploded perspective view showing the second embodiment of the present invention.
Figure 3B:
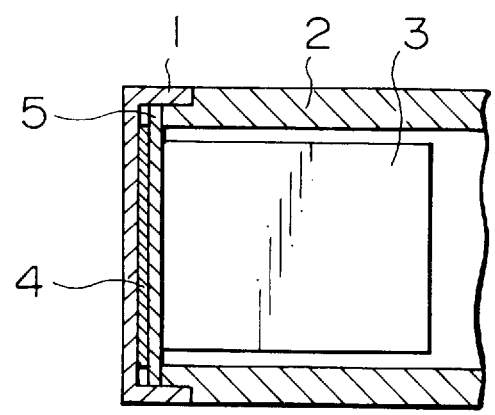
FIG. 3B is a sectional view showing the assembled state of the main part of the second embodiment shown in FIG. 3A.

As shown in FIGS. 3A and 3B, in the portable radio receiver of this embodiment, an antenna conductor 4 is constituted as a panel type antenna which is disposed on a surface (the first housing section 1 side surface) of a panel 5 made of a thin plate-like member, and the joint surfaces of first and second housing sections 1 and 2 respectively form recessed and projecting structures such that the panel 5 can be accommodated between the first and second housing sections 1 and 2.

More specifically, the shape of a recessed portion 1a of the joint surface of the first housing section 1 is formed to have such a size that it can accommodate at least the panel 5 of the panel type antenna. A projecting portion 2a of the joint surface of the second housing section 2 is formed into such a size that it is fitted in the recessed portion 1a accommodating the panel type antenna and that it is abutted against the rear surface of the panel 5.

An apparatus board 3 is attached to the rear surface of the panel 5 and is connected to the antenna conductor 4 through a through hole (not shown) or the like in the panel 5.

In this manner, when the antenna is formed as a panel type antenna, it is firmly sandwiched between the recessed and projecting portions 1a and 2a of the two housing sections 1 and 2, respectively (the state shown in FIG. 3B). At the same time, loop antennae having various shapes, as shown in FIGS. 4A and 4B, and various types of flat antennae, e.g., a micro-strip antenna, a slit antenna, and the like can be formed, so that the antenna gain can be further increased.

Figure 4A:
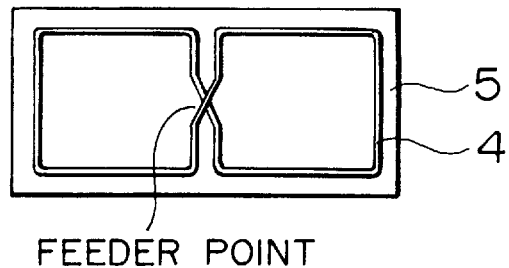
FIGS. 4A to 4E are front views respectively showing various types of modifications of a panel-like antenna incorporated in the second embodiment.
Figure 4B:
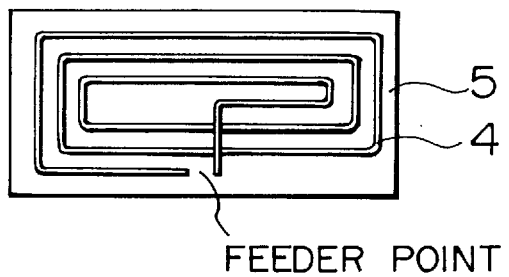
Figure 4C:
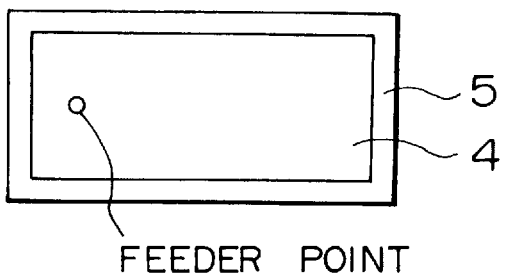
Figure 4D:
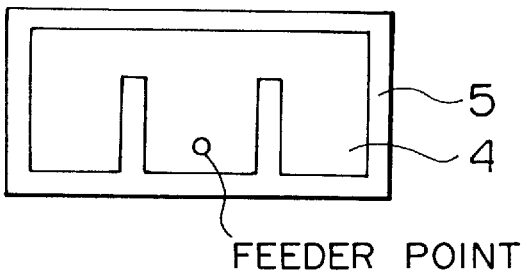
Figure 4E:
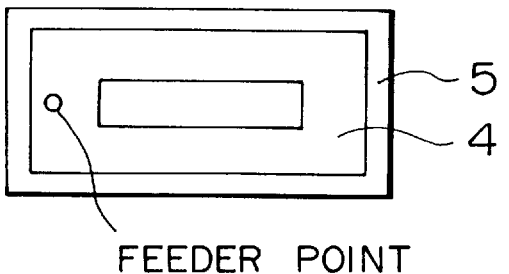

For example, a belt-like antenna conductor 4 or the like similar to that of the first embodiment may be disposed to form various loop shapes, as shown in FIGS. 4A and 4B. Also, as shown in FIGS. 4C to 4E, an antenna conductor 4 may be formed as an antenna pattern on the upper surface of a panel 5, and a ground pattern (not shown) may be formed on the lower surface of the panel 5, thereby forming various types of flat antennae, e.g., a micro-strip antenna, a slit antenna, and the like.

What is claimed is:

1. A portable radio receiver with a built-in antenna, comprising a housing, an antenna conductor disposed in an internal space of said housing, and an apparatus board to be connected to said antenna conductor, wherein said housing is divided into at least two sections, and said divided housing sections form one integral housing upon being joined together, one divided housing section, of said at least two divided housing sections having a joint surface formed with a recessed portion, and the other divided housing section having a joint surface formed with a projecting portion to fit in said recessed portion, and said antenna conductor is interposingly housed between said divided housing sections whereby when said recessed and projecting portions are fitted with each other, said two divided housing sections form one integral body, and said antenna is sandwiched between said recessed and projecting portions.

2. A receiver according to claim 1, wherein said antenna conductor is a loop antenna, the recessed portion has a groove at a deep end in an inner wall thereof for accommodating said loop antenna, whereby when said recessed and projecting portions are fitted with each other, said loop antenna is sandwiched between said recessed and projecting portions.

3. A receiver according to claim 1, wherein said antenna conductor is a panel type antenna disposed on a plate-like member, said projecting portion being fit in said recessed portion and abutted against a rear surface of said panel type antenna, whereby when said recessed and projecting portions are fitted with each other, said panel type antenna is sandwiched between said recessed and projecting portions.

4. A receiver according to claim 1, wherein said housing is made of a dielectric having a high dielectric constant.

* * * * *